United States Patent [19]

Rushing et al.

[11] Patent Number: 4,815,677

[45] Date of Patent: Mar. 28, 1989

[54] EMERGENCY LOCATOR DEVICE

[75] Inventors: John A. Rushing, Plantation; Sam Harris, Tamarac; Ross S. Penney, Fort Lauderdale, all of Fla.

[73] Assignee: Kiwi Research & Development Corp., Pompano Beach, Fla.

[21] Appl. No.: 84,298

[22] Filed: Aug. 11, 1987

[51] Int. Cl.[4] .......... B64B 1/50

[52] U.S. Cl. .......... 244/33; 116/210; 116/DIG. 9; 441/93; 441/94; 244/153 R

[58] Field of Search .......... 244/33, 153 R; 116/210, 116/DIG. 9; 441/93, 94, 9, 31; 222/5

[56] References Cited

U.S. PATENT DOCUMENTS

| | | | |
|---|---|---|---|
| 2,819,820 | 1/1958 | Allen | 222/5 |
| 2,830,309 | 4/1958 | Lawson | 116/210 |
| 2,923,917 | 2/1960 | McPherson | 116/210 |
| 3,332,310 | 7/1967 | Ashline | 116/210 |
| 3,727,229 | 4/1973 | Clinger | 116/210 |
| 3,941,079 | 3/1976 | McNeill | 116/210 |
| 3,952,975 | 4/1976 | Laske | 244/153 R |
| 4,029,273 | 6/1977 | Christoffel, Jr. | 244/153 R |
| 4,120,259 | 10/1978 | Wilson | 116/210 |
| 4,696,252 | 9/1987 | Gutl | 116/210 |
| 4,717,092 | 1/1988 | Cameron | 244/33 |
| 4,722,498 | 2/1988 | Cameron | 244/33 |

*Primary Examiner*—Galen Barefoot

*Assistant Examiner*—Rodney Corl

*Attorney, Agent, or Firm*—Henry Sternberg; Bert J. Lewen

[57] ABSTRACT

Helium inflatable emergency locator balloon having a longitudinal body and side wings defining horizontally a triangular, bilaterally symmetrical tetralobate monochamber having a forward lobate nose, a rearward lobate hind section and flanking rearward lobate wings, the latter three lobate portions being in side by side spaced apart and unconnected relation to each other and the hind section end extending rearwardly slightly beyond the wind ends, and in inflated condition each of the body and wings defining in longitudinal cross section a bilaterally symmetrical convex profile having a slightly rounded upper side and underside, a small rounded leading edge and an acutely pointed trailing edge, and a respective tail of streamer strips attached to each of the hind section and wing ends, such strips preferably constituting tuned radar reflective dipole strips, and optionally alternatively similar dipole strips being individually loosely disposed within the balloon, and a gas supply device for inflating the balloon, particularly including a gas supply flow rate control assembly for preventing a surge of filling gas from striking the balloon interior with a jet force capable of perforating the balloon.

11 Claims, 3 Drawing Sheets

L
W
T
A
C

EMERGENCY LOCATOR DEVICE

FIELD AND BACKGROUND OF THE INVENTION

The present invention relates to an emergency locator device, and more particularly to an inflatable balloon usable as an aloft emergency locator and its combination with an inflation gas supply device such as in the form of a hand size kit, as well as to a specific gas supply flow control assembly.

U.S. Pat. No. 2,570,549 to Hansell; U.S. Pat. No. 2,923,913 to McPherson et al; U.S. Pat. No. 2,888,675 to Pratt et al; U.S. Pat. No. 3,952,975 to Laske; U.S. Pat. No. 4,029,273 to Christoffel, Jr.; and U.S. Pat. No. 4,586,456 to Forward; show typical specifically shaped and dimensioned inflation balloons, some of which have so called "tuned" radar reflective surfaces, and which are usable as tether line attached emergency locators when allowed to rise and float aloft in the air to indicate, either visually or by radar scanning, the location of someone in distress at a remote area such as on the high seas, in a forest or jungle, or the like.

These locators are usually provided in kit form for manual or automatic inflation of the balloon, using various actuators to charge the balloon with inflation gas from a tank supply.

A distinct problem with the shape of the balloon is that it must be able to remain aloft under quiescent as well as turbulent wind and weather conditions. Thus, on the one hand, while a more spherical shaped balloon remains aloft efficiently under quiescent conditions, its performance is adversely affected by more turbulent conditions. On the other hand, while a more aerodynamic kite like shaped balloon, especially a winged balloon with web connections between the main body and wings, remains aloft somewhat efficiently under more turbulent conditions, it often cannot remain aloft properly under windless conditions.

Generally, it is well recognized that there are at least seven conflicting sets of parameters involved in optimizing a radar reflective and visual signal or locator spherical or kite type balloon. These are: (1) aerodynamic factors, (2) weight, (3) radar reflectivity, (4) size and convenience, (5) regulatory factors, (6) safety, and (7) cost. Obviously, any design which optimizes one area will suffer in others. For example, while a ten foot size balloon will be easier to spot than a one foot size type, cost, convenience, regulatory and other considerations may suffer.

These irreconcilable factors have severely limited the effectiveness of available types of inflation balloon locators and their associated gas supply devices.

Said U.S. Pat. No. 2,888,675 to Pratt et al; and U.S. Pat. No. 2,646,019 to Chetlan; U.S. Pat. No. 3,002,490 to Murray; U.S. Pat. No. 3,210,990 to Cantrell; U.S. Pat. No. 3,721,983 to Sherer; and U.S. Pat. No. 3,735,723 to Lutz; employ various combinations of a perforatable seal on the discharge spout of an inflation gas tank and a piercing member movable into piercing engagement with the seal, as an actuator to release the gas for charging a balloon such as a locator balloon, in some cases with appropriate flow openings downstream of the tank, i.e. along the path from the spout to the balloon, to provide necessary flow communication.

U.S. Pat. No. 3,332,390 to Ashline employs a robust washer threaded into the tank discharge spout in exterior abutting relation to a perforatable seal disk sitting on a shoulder in the spout, the washer having a large central opening so as to act as a striker for the rim of a piercing member to limit the depth of penetration of the seal disk when the member is urged toward the seal disk, and also to act as a wide central flow passage for the escaping gas, a complicated cylindrical concentric array of an expansion sleeve between a pair of multiple apertured caps being provided downstream of the tank to induce a fog condition in the gas being fed to an inflation balloon.

U.S. Pat. No. 2,684,180 to Allen concerns a classic dry chemical type large size invertible fire extinguisher, having an upright outer concentric chamber filled with extinguisher powder and an upright central chamber containing an upright tank filled with pressurized fluid and provided with a top discharge spout. The spout is internally threaded and has a shoulder at its inner end on which the rim of an inner centrally apertured dished disk is located. An outer perforatable flat seal disk is disposed on the rim of the apertured dished disk, such that the central dished portion of the apertured disk is spaced slightly inwardly of the plane of the separate seal disk, and a ring nut is screwed into the threaded spout to compress the seal disk against the dished disk as a gasket on the shoulder to seal mechanically the tank spout. The central aperture of the dished disk is sized to provide a fluid limiting flow opening to discharge the pressurized fluid at a powder agitating and entraining rate over a fire extinguishing time span.

For this purpose, in the Allen extinguisher, the pointed end of a movable piercing member normally projects into the spout within the ring nut in close facing relation to the seal disk, under the retracting force of a spring keeping the pointed end away from the seal disk. Upon inverting the extinguisher and striking it against the ground, the rear end of the piercing member is driven upwardly against the force of the spring to cause the pointed end to perforate the seal disk of the inverted tank, discharging a surge of fluid to agitate and entrain the likewise inverted mass of powder in the outer chamber for delivery to a flexible hose atatched via an elbow to an adjacent part of the extinguisher.

Clearly, for proper operation of the Allen extinguisher, the fluid must be stored in the tank at very high pressure to insure sufficient jet speed flow of fluid through the central aperture of the dished disk upon perforating the seal disk to transport large amounts of powder through the hose at a high rate for rapid fire fighting purposes, and the piercing member, spring, seal disk, apertured disk, and related parts, must be precisely sized and positioned relative to each other to prevent the piercing member from also striking the central aperture margins of the dished disk and uncontrollably enlarging the central aperture when the extinguisher is inverted and struck against the ground.

It will be appreciated that an inherent danger with conventional inflation gas supply devices for emergency locator balloons is that upon opening the tank spout, the initial surge of pressurized gas could locally strike the uninflated balloon interior with a jet force sufficient to cause the balloon to be perforated and rendered useless.

In this regard, one known commercial form of an emergency locator kit utilizes a pair of small size pressurized gas tanks, each equipped with a perforatable seal in its discharge spout, plus a corresponding piercing member movable into piercing engagement with the seal and an actuator to effect piercing movement of the associated piercing member, for inflating a single locator balloon with the separate charges of pressurized gas at a safe rate from the two tanks. This separate incremental charging avoids the danger of perforating the balloon as would occur if the full quantity of the needed inflation gas were stored in a single tank. This is because the use of a single tank would necessarily involve a much higher order of magnitude storage pressure and generally a larger tank, and upon tank spout seal perforation by the piercing member such arrangement would potentially deliver an initial surge of pressurized gas capable of perforating the uninflated balloon.

As to the gas itself, of course air and carbon dioxide are unsuitable because they are not lighter than air and a locator balloon filled with such a gas will not remain aloft under still wind conditions. Also, use of large volume size balloons requires large and heavy gas supply tanks and/or high storage pressures, adding to the cost and weight of the unit, and more especially to the danger inherently associated with high pressure storage tank systems. Even with a lighter than air gas such as helium stored at a safe pressure in a small size tank for inflation of a small size balloon, the unit is still subject to the problem traceable to the shape of the balloon itself.

Thus, for purely aerodynamic reasons, round balloons are useles ssince they tend to blow down immediately in modest winds, where was aerodynamically efficient pure kites are useless since they will not fly in zero winds as are common at night or in a fog when the signal locator is often most needed. While a lifting body of streamline shape such as a kite shaped and/or teardrop shaped inflated balloon is able to fly in the desired wind velocity range, it suffers generally from poor radar reflectivity, irrespective of the balloon material used since this result is purely a function of shape.

Although an ideal shape aerodynamically would be that akin to a military stealth bomber, such constitutes the worst possible radar reflector shape, an advantage for military purposes but a disadvantage for an emergency locator. For this reason, various attempts have been made at radar enhancement by use of radar reflective surfaces in conjunction with an aerodynamically efficient winged lifting body shape. Adding tails having aerodynamic stabilizing effect unfortunately is limited by mass and drag considerations. Indeed, the locator tails must be of properly selected width and length, made of appropriate material, and be lightweight for accommodating such mass and drag limitations.

SUMMARY OF THE INVENTION

It is among the objects and advantages of the present invention to overcome the drawbacks and deficiencies of the prior art, and to provide an emergency locator device, including an inflatable balloon of specific shape, usable as an aloft emergency locator generally equally efficiently under both quiescent and turbulent wind and weather conditions, and the combination of such balloon with an inflation gas supply device such as in the form of a hand size kit, with attendant optimizing of the associated conflicting operating parameters.

It is among the additional objects and advantages of the present invention to provide an inflation gas supply device for inflating an emergency locator balloon from a pressurized gas filled tank having a specific gas supply flow control assembly which insures a controlled rate of gas discharge from the tank preventing a surge of gas from locally striking the interior of the balloon with a jet force capable of perforating the balloon.

It is among the further objects and advantages of the present invention to provide such a locator balloon and such a gas supply flow control assembly for an inflation gas supply device, each of which is relatively simple and inexpensive in construction, and readily fabricated.

According to one aspect of the present invention, an emergency locator is provided which comprises an inflatable balloon having an inflation valve and associated radar reflective dipole strips of width and length constituting even multiples substantially of a corresponding radar wavelength signal. The balloon includes a longitudinal body and a symmetrical pair of angularly outwardly and rearwardly extending elongate lobate wings.

The body has a lobate nose rearwardly terminating in a constricted neck, a midsection having a shoulder end connected to the neck, a hip end and open sides between the shoulder and hip ends, and a lobate hind section having a forward end connected to the hip end and a freely disposed rounded aft end. The wings each have a medial end connected to a corresponding midsection open side and a freely disposed rounded distal end.

The body and wings together define horizontally a generally triangular shaped, bilaterally symmetrical tetralobate monochamber, with the wings and hind section in side by side spaced apart and unconnected relation to each other, and with the hind section aft end extending rearwardly slightly beyond the wing distal ends. In inflated condition, the body and wings each define in longitudinal direction cross section a generally bilaterally symmetrical convex profile having a slightly rounded upper side and underside, a relatively small rounded leading edge and an acutely pointed trailing edge.

A respective tail in the form of a plurality of streamer strips is attached to each of the hind section aft end and wing distal ends.

The emergency locator inflatable balloon may be conveniently provided in combination with an inflation gas supply device. Such combination may comprise an openable housing having an interior space containing the uninflated locator, a tank fillable with pressurized inflation gas and having an openable discharge passage, a manifold having an inlet flow connected to the passage and an outlet releasably flow connected to the balloon inflation valve, a tether line dispenser containing a tether line having an end connectable to the balloon, and an actuator operatable upon opening the housing for opening the passage and discharging gas through the manifold to inflate the balloon.

According to another aspect of the present invention, an emergency locator kit is provided in the form of a hand size openable housing having a manually holdable hollow base and hollow cover, with an uninflated emergency locator balloon disposed in the cover and having an inflation valve, and a tank fillable with pressurized inflation gas disposed in the base. The tank has a tubular discharge spout plugged with a specific gas supply flow control assembly in the form of a mating hollow tubular sealing insert closed off at its outer end by a perforatable seal and at its inner end by an apertured disk spaced a selective axial distance inwardly of the seal and containing restrictive flow apertures distributed intermediate the center and periphery of the disk.

A manifold is provided which has an inlet flow connected to the spout and an outlet releasably flow connected to the balloon inflation valve, and a tether line dispenser is positioned in the housing which contains a tether line having an end connectable to the balloon.

As actuator means, a piercing member is located in the manifold, yieldably disposed in facing relation to the seal under the retracting force of a resilient biasing element and movable against such force from a retracted position in which the member is spaced from the seal to an extended position in which the member perforates the seal and is spaced from the disk, to permit gas discharge in restrictive flow through the disk apertures and thence through the perforated seal and manifold to the balloon. In conjunction therewith, a control lever is disposed for engagement with the member when in its retracted position for urging the member against the retracting force to its extended position upon opening the housing.

Most significantly, the restrictive flow apertures of the disk are collectively sized to control the rate of gas discharge sufficiently to prevent a surge of gas from locally striking the balloon interior with a jet force capable of perforating the balloon.

BRIEF DESCRIPTION OF THE DRAWINGS

Other and further objects and advantages of the present invention will become apparent from the within specification and accompanying drawings, in which:

FIGS. 8 is a plan view of the gas flow controlling apertured disk of the specific gas supply flow control assembly according to an embodiment of the present invention which is inserted in the tank spout as shown in FIGS. 6 and 7.

DESCRIPTION OF THE PREFERRED EMBODIMENTS

Figures 1, 2, 3:
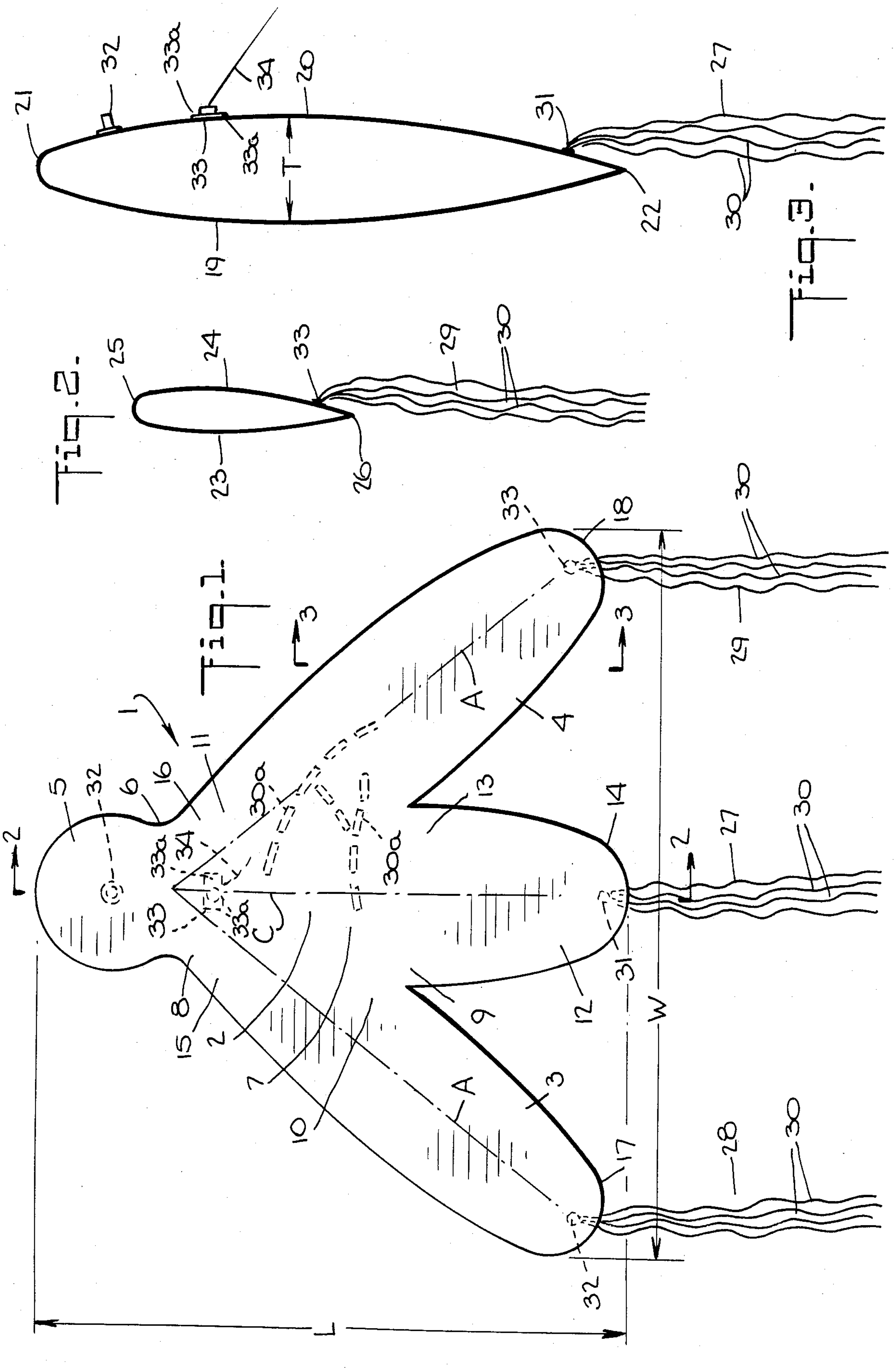
FIG. 1 is a plan view of the emergency locator in the form of a specifically shaped inflatable balloon according to one embodiment of the present invention.
FIGS. 2 and 3 are sectional views of the body and right wing respectively of the balloon of FIG. 1, taken along the lines 2—2 and 3—3 thereof.

Referring to the drawings, and initially to FIGS. 1-3, an emergency locator in the form of an inflatable balloon 1 is shown, having a longitudinal body 2 and a symmetrical pair of angularly outwardly and rearwardly extending elongate lobate shaped left and right wings 3, 4.

Body 2 integrally includes a lobate shaped nose 5 rearwardly terminating in a constricted neck 6, a midsection 7 having a shoulder end 8 connected to neck 6, a hip end 9 and bilaterally open sides 10, 11 between shoulder end 8 and hip end 9, and a lobate shaped hind section 12 having a forward end 13 connected to the midsection hip end 9 and a freely disposed rounded aft end 14.

Wings 3, 4 correspondingly have medial ends 15, 16 connected integrally to the midsection open sides 10, 11, and freely disposed rounded distal ends 17, 18, and in effect provide a set of swept back wings on the body in a modified rearwardly fluted delta shaped balloon design. Specifically, the angular axis A of each wing preferably individually forms with the longitudinal axis C at the body centerline an acute angle of about 40 degrees having its apex at neck 6.

In particular, body 2 and wings 3, 4 together define horizontally, i.e. in plan as shown in FIG. 1, a generally triangular shaped, bilaterally symmetrical tetralobate monochamber, composed of the forwardly directed lobate nose 5 and the rearwardly directed lobate hind section 12 and lobate wings 3, 4 commonly joined to the adjacent perimetric portions of midsection 7, with wings 3, 4 and hind section 12 in side by side spaced apart and unconnected relation to each other and the freely disposed aft end 14 extending rearwardly slightly beyond the freely disposed wing distal ends 17, 18.

As shown in FIGS. 2 and 3, body 2 and wings 3, 4 in inflated condition each define in parallel longitudinal direction cross section a generally bilaterally symmetrical convex profile correspondingly having a slightly rounded upper side and underside 19 and 20, or 23 and 24, a relatively small rounded leading edge 21, or 25, and an acutely pointed trailing edge 22, or 26, as the case may be, all such profiles being of generally like shape but differing size.

The locator balloon is provided with three tails 27, 28, 29, each in the form of a plurality of streamer strips 30, attached at points 31, 32, 33 to the undersides of hind section aft end 14, left wing distal end 17 and right wing distal end 18, respectively. Since balloon 1 is intended to be associated with radar reflective dipole strips of width and length constituting even multiples substantially of a corresponding radar wave length signal for tuned operation in view of the emergency locator nature of the balloon, some or all of the strips 30 of such tails 27, 28, 29 may conveniently be in the form of radar reflective dipole strips of said type as shown.

Alternatively, the associated radar reflective dipole strips may be provided as a plurality of individual dipole strips 30a of such type loosely disposed internally within balloon 1 as shown in phantom in FIG. 1.

An inflation valve 32, such as a simple check valve, is conveniently located on the underside of nose 5, and a tether line attachment yoke 33 advantageously having a plurality of adjustment attachment positions 33*a* for fine balance and stability adjustment of the tether line is similarly located on the underside of midsection 7 in the vicinity of neck 6.

Desirably, balloon 1 is structurally skeleton-free, non-rigid, and made of relatively thin, expandable, lightweight film material impermeable to inflation gas such as helium. It is readily provided of a size having an inflation volume of about one cubic foot, and is preferably filled with helium as lighter than air inflation gas. In one preferred form, balloon 1 is dimensioned to provide a body about 29 inches long (length L in FIG. 1) and about 12.5 inches wide, and wings each about 28 inches long measured from the body centerline or axis C at neck 6 to the wing distal end 17 or 18 and about 8.5 inches wide, and a balloon transverse width of about 39 inches measured between the laterally outermost edges of wings 3, 4 (width W in FIG. 1).

Preferably, balloon 1 has a width to length ratio W:L of about 1.33:1 or 1:0.75, and a centerline height or thickness to length ratio T:L of about 0.166:1 or 1:6 (see FIGS. 1 and 2). Such ratios may be varied by an amount of ±10% of the stated W or T value relative to the W value when taken as unity (W=1).

Balloon 1 may be fabricated for instance from two superimposed layers of the intended thin sheet material, such as a 1.5 mil thcik laminate of polyethylene film and metallized, e.g. aluminized, Mylar film (trademark of E. I. du Pont de Nemours, Inc.), of silhouette shape as shown in FIG. 1, sealed along their common peripheral edges by heat sealing, e.g. at a temperature of about 325° F. and a sealing pressure of about 35 psi (within acceptable variations of about +10° F. and about ±10 psi without adverse effect on the seal).

Such laminate material is particularly preferred as it is impermeable to inflation gas such as helium, very light in weight, tear resistant and puncture resistant, efficiently expandable yet storable in minimum space in compact uninflated condition, highly radar reflective, easily visible to the naked eye due to its visibility enhanced metallized coating, and relatively inexpensive. In comparison thereto, other materials such as those available under the trademark designations Tedlar and Mylar (per se) are permeable to helium and not expendable, and thus are not usable successfully for the contemplated purposes. Nevertheless, it will be realized that the balloon material only represents a secondary source of the desired radar reflectivity, as the strips 30 or 30*a*, i.e. as such dipole strips, constitute the primary source thereof.

Moreover, such laminate material is advantageously water repellent in that it is resistant to wetting by water, e.g. sea water, which would add weight and drag to the balloon and potentially prevent its vital ascent, thereby undermining its primary locator purpose.

Valve 32 may be provided as a conventional molded plastic valve heat sealed to laminate balloon 1 at the center of the underside of nose 5 by ultrasonic welding, or cemented thereto by adhesive cement such as an alpha cyanoacrylate, e.g. one sold under the trademark Crazy Glue. Yoke 33 may also be provided as a molded plastic part similarly so cemented to balloon 1 at the center line of the underside of midsection 7 in the vicinity of shoulder end 8.

Tether line 34 may be provided as a string or cord of Dacron or other plastic or natural fiber material, preferably having at least a 40#rating, to assure efficient performance under all possible wind and weather conditions for a balloon of the foregoing type.

The strips 30 of tails 27, 28, 29, as well as the individual loose strips 30*a* alternatively within balloon 1, may be desirably made of the same polyethylene and metallized Mylar laminate material as balloon 1, and are designed so that their width and length are even multiples of the wave length of the typical radar system being used. Preferably, with a view for tuning the strips 30 or 30*a* to a radar frequency range of 9200–9500 Megahertz, at a wave length of 3 cm (per Safety of Life at Sea regulations, since most ship borne search radar systems operate in that range), their strip width will be more or less exactly equal to such wave length, e.g. 3.1–3.3 cm wide, particularly 3.2 cm (i.e. the midpoint of the desired spectrum), and their strip length will be more or less an exact multiple of such wave length, e.g. about 31–33 cm long, particularly 32 cm (i.e. a multiple of such midpoint). Alternatively, they may be about 1.94 inches wide and 23.28 inches long.

Such dimensions result in acceptable radar reflectivity without excessive drag traceable to tails 27, 28, 29. Excessive drag is that amount of drag which causes the balloon to fly at too low a height and be lost in ground clutter to the radar source. Absent weight and aerodynamic limitations, an infinitely large number of such strips 30 or alternatively strips 30*a* could be associated with balloon 1 for optimum signal locator purposes.

Significantly, because of the alternative internal location of the individual loose strips 30*a* within balloon 1, a large number thereof may be accommodated in the balloon without regard for drag and aerodynamic considerations as limit the number and length of the tail strips 30, i.e. as dipole strips. In fact, strips 30*a* may be made of glass or any other ultra light fibers, coated with very fine metallized surfaces, for economical production of large quantities of only 3.2 cm long dipole strips 30*a*, rather than 32 cm long dipole tail strips 30, packed loosely in balloon 1 as the desired radar reflective dipoles, overcoming the primary disadvantage of exterior radar reflective appendages, i.e. drag, and aerodynamically freeing the tails 27, 28, 29 from adherence to the stated dipole dimensions, in terms of the width and length multiples noted above.

Figure 5:
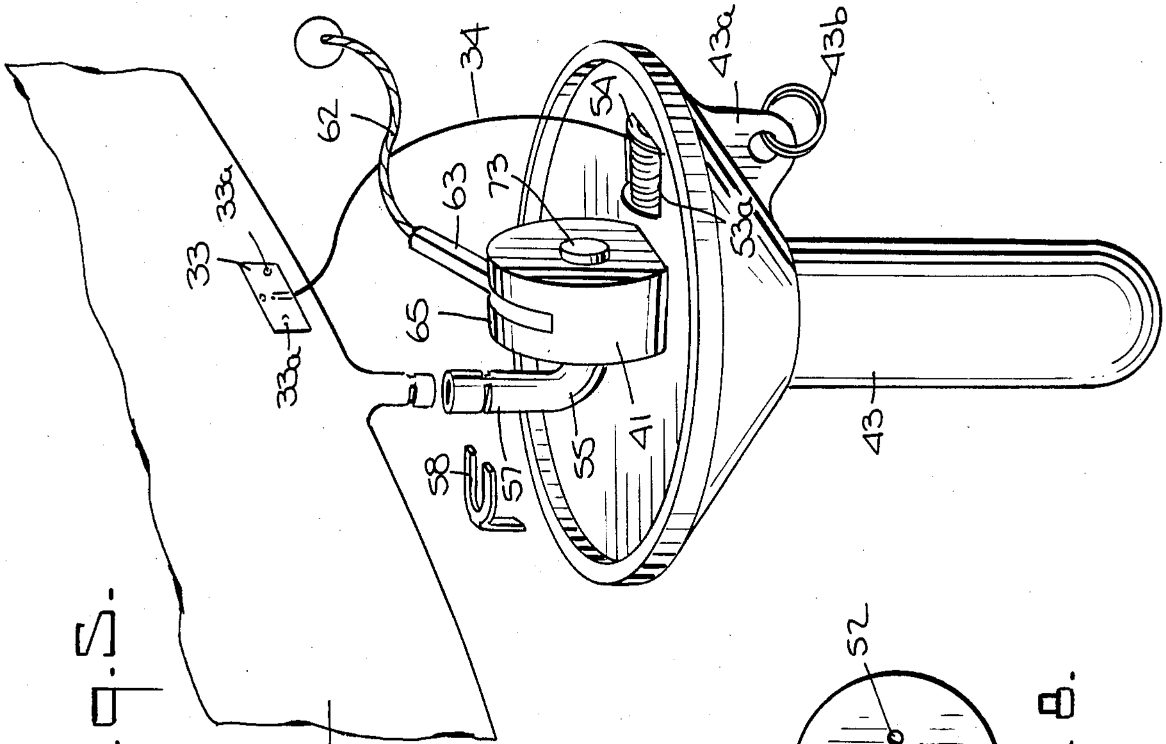
FIG. 5 is a perspective view of the kit of FIG. 4 upon opening the housing, and inflating and releasing the locator balloon with the tether line attached.
Figure 4:
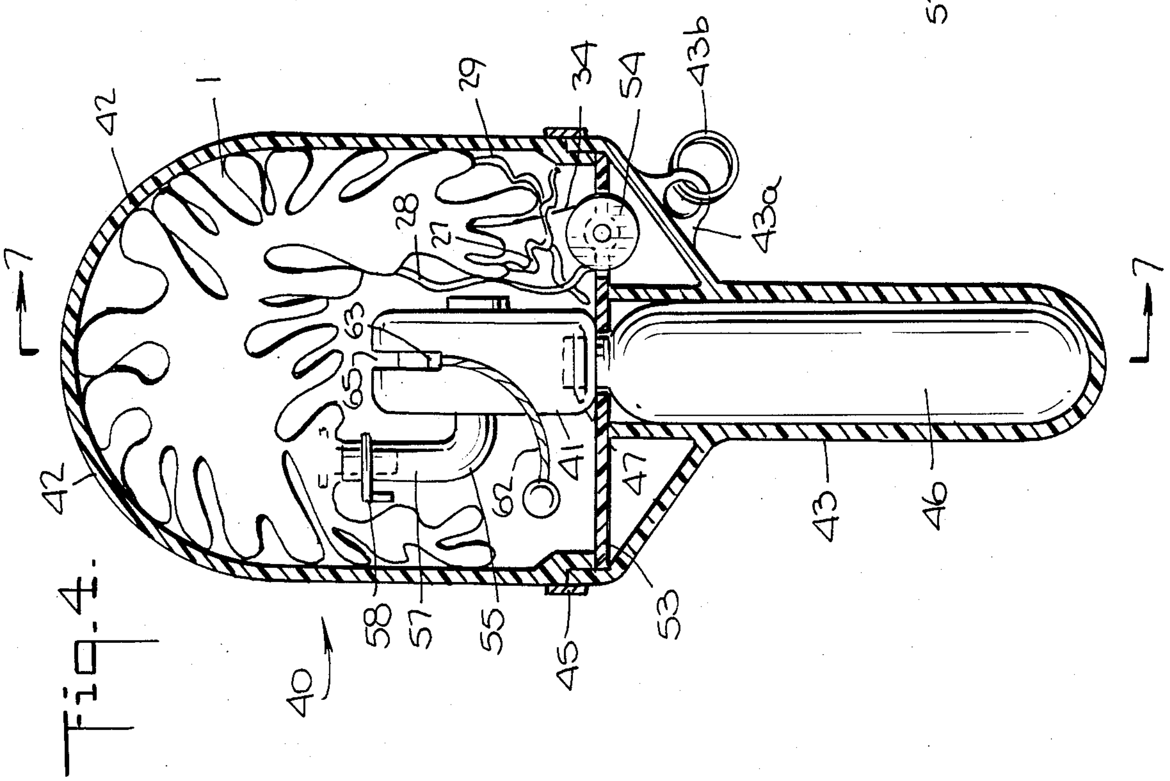
FIG. 4 is a sectional view of an emergency locator kit according to a particular embodiment of the present invention.

As shown in FIGS. 4 and 5, a kit 40 of an inflation balloon 1 in combination with an inflation gas supply device 41 is conveniently provided in the internal space of a hand size openable plastic housing 42, having a manually holdable upwardly flared tubular hollow base 43 and domed hollow cover 44 temporarily sealed together against the environment by an adhesive tear strip 45 at the same therebetween. Balloon 1 in uninflated condition stores easily in cover 44 and a small tank 46 filled with prssurized inflation gas, preferably helium, is disposed in the lower tubular portion of base 43 whose exterior conveniently serves as a handle, and which may include a carrying clip 43*a* and mounting ring 43*b*.

Figure 6:
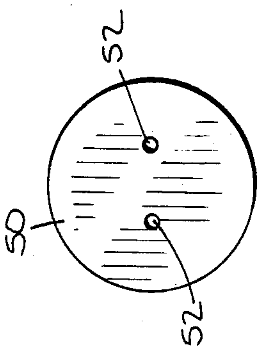
FIG. 6 is an enlarged sectional view of a portion of the interior of the kit of FIG. 4, showing the tank spout, manifold and actuator for opening the spout discharge passage under controlled flow conditions.
Figure 7:
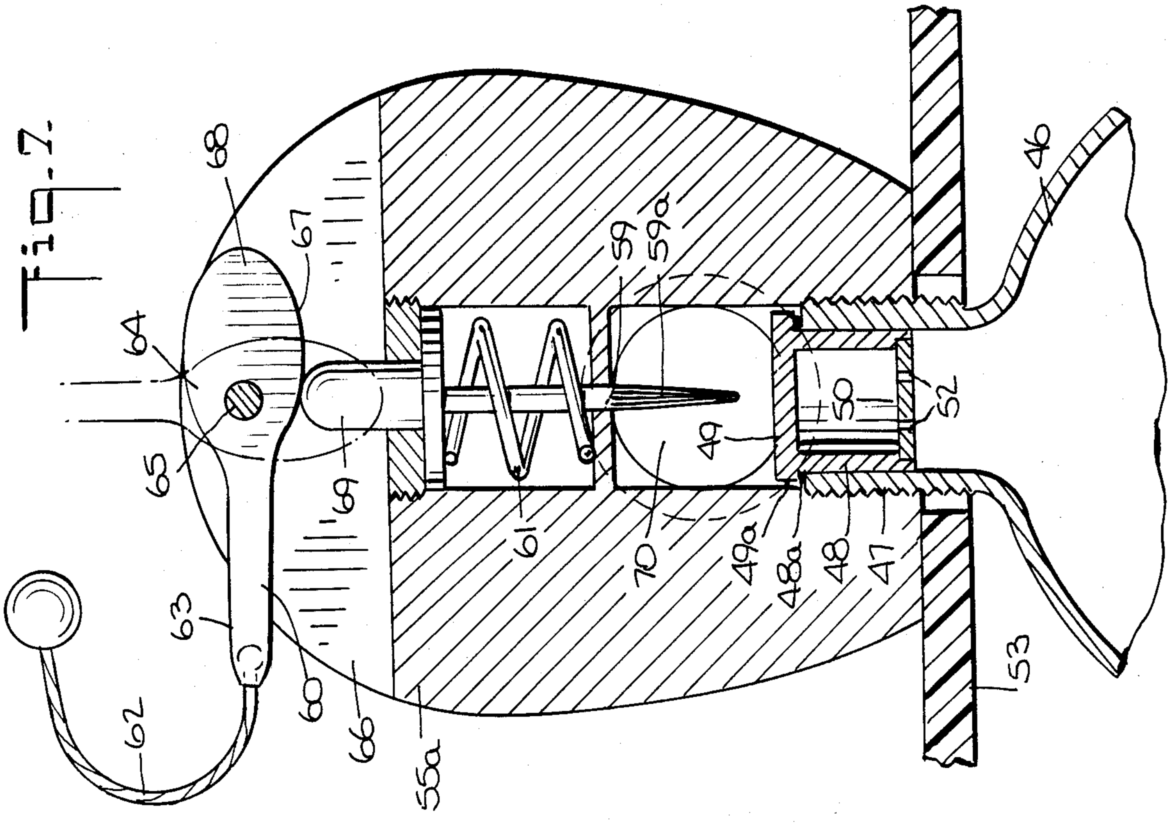
FIG. 7 is an enlarged sectional view of a portion of the kit of FIG. 4, taken along the line 7—7 thereof, and indicating the manner of operating the actuator.
Figure 6:
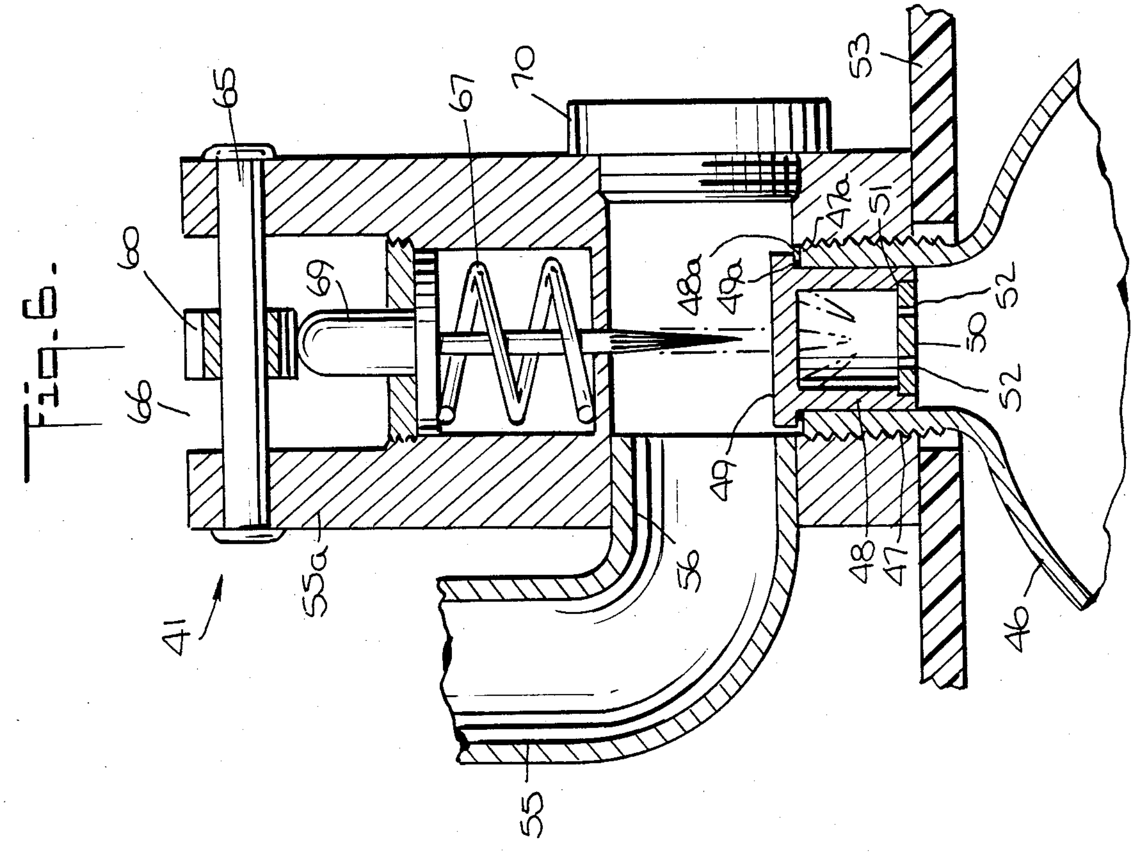

Tank 46 has an openable discharge passage such as in the form of an upper end tubular discharge spout 47, which in accordance with a particular feature of the present invention is plugged with a special mating hollow tubular sealing insert 48 (FIGS. 6 and 7). Insert 48 is closed off at its outer end by a perforatable seal 49 integral therewith and at its inner end by an apertured disk 50 seated on shoulder 51 and spaced a selective axial distance inwardly of seal 49. Disk 50 contains as an essential collective component thereof restrictive flow apertures 52, preferably distributed intermediate the center and periphery thereof, but in any case collectively sized to control the rate of flow of gas discharge sufficiently to prevent a surge of gas from striking the balloon 1 interior with a jet force capable of perforating the balloon (FIG. 8).

To plug inset 48 into spout 47, once tank 46 is filled with pressurized gas in conventional manner, insert 48 carrying disk 50 at its inner end is preferably simply welded to spout 47 to form a bond 48*a* between the annular spout edge 47*a* and the annular overlapping facing edge of the rim flange 49*a* of seal 49. Alternatively, adhesive cement, such as that noted above for attaching inflation valve 32 to balloon 1, may be applied to form bond 48*a* between spout edge 47*a* and the overlapping facing edge of rim flange 49*a*, and insert 48 so carrying disk 50 at its inner end may be simply inserted into spout 47 and pressed against spout edge 47*a* to provide a gas tight cemented closure. Favorably, disk 50 and insert shoulder 51, as well as the radial or transverse dimensions of spout 47 and insert 48, are respectively sized for corresponding friction fit engagement of the coacting parts, and of course any means may be used to weld or otherwise connect insert 48 to spout 47, and if desired to weld or otherwise connect disk 50 to shoulder 51.

Tank 46 is removably maintained in base 43 by transverse retainer 53, which may be sized for friction fit with the upper flared portion of base 43. Slot 53*a* in retainer 53 is provided to mount rotatably dispenser spool 54 which contains a suitable length, e.g. 75 feet, of tether line 34 having its outer end connected to balloon 1 at yoke 33 (see FIG. 1).

Besides tank 46 and insert 48, gas supply device 41 also includes a conventional assembly, such as a Halkey Roberts Valve Model #840 AM unit, composed of a bilaterally mating manifold 55, having inlet 56 mating with or flow connected to spout 47 in the usual manifold or puncturing valve type housing 55*a*, and outlet 57 releasably mating with or flow connected to inflation valve 32 of balloon 1 such as by use of manually removable clip 58. Device 41 further includes as actuator means for the unit a piercing member 59 and control lever 60. Member 59 is operatively located in housing 55*a* yieldably disposed in facing relation to seal 49 under the retracting force of a resilient biasing element such as coil spring 61, and may favorably contain fluting grooves 59*a* or the like about its periphery.

Hence, member 59 is movable against such spring force from the retracted position shown in FIG. 6, in which it is spaced from seal 49, to an extended position in which it perforates seal 49 and is spaced from disk 50, as shown in phantom in FIG. 6, whereby a permit gas discharge in restrictive flow through disk apertures 52, perforated seal 49 and manifold 55 to balloon 1. Such fluting grooves 59*a* or the like in member 59 facilitate unhindered outward flow of escaping gas around the gross margins of the perforated opening of seal 49. Lever 60 is disposed for engagement with member 59 when in its retracted position for urging the member against the retracting force of spring 61 to its extended position, i.e. upon opening housing 42 to permit balloon 1 to be removed from cover 44 for proper inflation.

For this purpose, cord pull 62 is attached to the force end 63 of lever 60, mounted at its intermediate fulcrum portion 64 to pivot 65 in slot recess 66 of housing 55*a*, to raise lever 60 and bring camming surface 67 on its load end 68 into urging engagement with the exposed rear end 69 of member 59 acting as follower. This causes member 59 to move against the retracting force of spring 61 downwardly through a relatively short amplitude stroke into piercing engagement with seal 49 in the manner of a punch, all under the manual pulling force of cord pull 62.

Conveniently, an end cap 70 may be provided on housing 55*a* to afford access to the interior of manifold inlet 56 and the adjacent parts of the actuator.

Of course, any other means in particular may be used instead of parts 60 to 69 to provide a mechanism for actuating member 59, and any other means in general may be used to achieve controlled perforation of seal 49 without disturbing the integrity of disk 50 and in turn flow of the safety release gas for inflating balloon 1.

In this regard, because of the coacting threads on the interior of housing 55*a* in the vicinity of spout 47 as well as on the exterior of spout 47, housing 55*a* may be screwed onto spout 47 to a selective axial point above seal 49 to insure that at the end of its punching stroke, corresponding to the operative radial distance from pivot 65 to load end 68 of lever 60, member 59 will effectively perforate seal 49 yet be located at a point sufficiently above disk 50 to insure that the disk is not touched and its restrictive flow aperture area is not disturbed.

It will be noted that, due to the location of disk 50 within tank 46, once seal 49 is perforated by member 59, all escaping gas must first pass through disk apertures 52 for selectively controlled restrictive flow. Accordingly, the thereby modified and thus preset external flow rate of such gas escaping through the gross puncture resulting from the perforating action of member 59 against seal 49 will undergo little or no change of its preset flow rate, or its dynamic velocity or pressure, once it leaves apertures 52, whereupon the gas will enter balloon 1 via valve 32 under conditions insufficient to cause balloon wall rupture yet sufficiently rapid for inflating balloon 1 in an acceptably short time span.

Due to its internal location in tank 46, disk 50 is inherently protected from damage, and its apertures 52 are inherently protected from clogging and from any other external source of disturbance. Also, by reason of its seating against shoulder 51, disk 50 is unaffected by the pressure thereacross once seal 49 is perforated.

As may be seen from FIGS. 6–8, as the case may be, insert 48 is selectively sized so as to maintain a pronounced axial space between seal 49 and disk 50, and disk 50 desirably contains a pair of equal size apertures located symmetrically therein for balanced controlled flow of gas therethrough, the collective size of such apertures being such as to control the rate of gas discharge sufficiently to prevent a surge of gas from locally striking the balloon interior with a jet force capable of perforating balloon 1. Although the number of apertures 52 may be more than two, they are desirably equidistantly spaced apart from each other and positioned intermediate the center and periphery of disk 50 for balanced controlled flow of escaping gas, as well as collectively sized for presenting the stated type gas surge into balloon 1.

For filling balloon 1 of one cubic foot volume, tank 46 may take the form of a convenient 4.95 cubic inch size steel vessel or cartridge, having a burst strength of 13,000 psi, which is sufficient to hold the needed one cubic foot amount of helium and which can loaded at an operating fill pressure of nominally 6,000 psi and then plugged safely with insert 48. This avoids concern with stricter governmental regulations as apply to use and handling of high pressure vessels greater than 5 cubic inch capacity, or danger as might arise in handling pressurized gas such as helium at unsafe pressures of more than 10,000 psi using commercially available equipment. Hence, in limiting the pressure in tank 46 to slightly over one half of that unsafe pressure, a safety factor of about 100% is provided in a kit package which is small enough to be carried conveniently and safe at a very broad range of temperatures, whereas the one cubic foot size balloon 1 is sufficient for attaining the primary locator purpose.

In contrast to the foregoing, were such kit to be provided as a pocket size unit, e.g. having a tank of about 1 cubic inch capacity for holding enough helium to inflate a balloon with one cubic foot of such gas, which may be considered the minimum amount for an acceptable locator balloon, the tank internal pressure would come to about 25,000 psi, and render the unit uneconomical and impractical, considering the technical hazards of handling such high pressures, as well as unsafe in use.

A particular advantage of the two piece plug assembly of insert 48 and apertured disk 50 is that the unit may be welded or bonded readily and reliably to tank spout 47, with seal 49 constituting an integral and leakproof wall of the plug.

It will be seen from the foregoing, that the above aspects of the present invention optimize the at least seven earlier stated conflicting parameters. The balloon and gas supply device or filling equipment in the provided kit 40 are portable and convenient, permitting an active boater or sportsman to wear or carry the kit when under way at sea or in a wilderness area, since the kit may be readily provided in a form occupying less than one cubic foot of space and weighing less than 27 ounces.

The balloon 1 of the type described as signal device is capable of flying in winds from zero to thirty knots at temperatures from 30 degrees below zero to 140 degrees (F), is capable of staying airborne for at least about 72 hours and maintaining its maximum, e.g. 75 foot tether line, height in windless conditions, as are common at night or in a fog when the signal locator is most often needed and when searchers must often abort search and rescue operations, is detactable by ship borne search radar, e.g. on X and S bands, with a mast height of no more than about 28 feet, on at least 50 % of radar sweeps at a distance of not less than about 5 nautical miles, and is visually detectable at 1,000 yards in clear daylight. The kit is able to be produced at a cost for sale at an affordable price within the reach of the average working person, is safe to manufacture without involving undue technology and handling or associated governmental regulation, as well as safe to operate by the layman.

The available helium is sufficient to lift balloon 1, including valve 32, tails 27, 28, 29, and the 75 feet length of tether line 34. Whereas a round or spherical balloon would give the most volume of helium for the least surface area and hence least weight, but for aerodynamic reasons is unacceptable, and whereas a planar array such as a kite which maximizes lift area but minimizes volume is also unacceptable, the design of balloon 1 provides an acceptable compromise which optimizes the various factors involved, as has been established herein by trial and error solution. Specifically, balloon 1 provides a favorable compromise between radar reflectivity and flying ability under all wind and weather conditions, using only about one cubic foot of helium for lift.

It will be appreciated that the foregoing specification and accompanying drawings are set forth by way of illustration and not limitation of the present invention, and that various modifications and changes may be made therein without departing from the spirit and scope of the present invention which is to be limited solely by the scope of the appended claims.

What is claimed is:

1. Emergency locator, which comprises an inflatable balloon having an inflation valve and associated radar reflective dipole strips of width and length constituting even multiples substantially of a corresponding radar wavelength signal, the balloon including a longitudinal body having a nose end, a midsection connected to the nose end, a hip end and open sides between the nose end and hip end, and a lobate hind section having a forward end connected to the hip end and a freely disposed rounded aft end, a symmetrical pair of angularly outwardly and rearwardly extending elongate lobate wings, each having a medial end connected to a corresponding midsection open side and a freely disposed rounded distal end, the body and wings together defining horizontally a generally triangular shaped, bilaterally symmetrical monochamber, with the wings and hind section in side by side spaced apart and unconnected relation to each other, and with the hind section aft end extending rearwardly slightly beyond the wing distal ends, and the body and wings in inflated condition each defining in longitudinal direction cross section a generally bilaterally symmetrical convex profile having a slightly rounded upper side and underside, a relatively small rounded leading edge and an acutely pointed trailing edge, a respective tail in the form of at least one streamer strip attached to each of the hind section aft end and wing distal ends, and a plurality of individual radar reflective dipole strips of width and length constituting even multiples substantially of a corresponding radar wavelength signal loosely disposed in the balloon.

2. Locator of claim 1 wherein each said tail streamer strip includes a plurality of radar reflective dipole strips of width and length constituting even multiples substantially of a corresponding radar wavelength signal.

3. Locator of claim 1 wherein said nose end comprises a lobate nose rearwardly terminating in a constricted neck.

4. Locator of claim 1 wherein the body has a longitudinal axis and the wings each have an angular axis individually forming with the longitudinal axis an angle of about 40 degrees.

5. Locator of claim 1 wherein a tether line attachment yoke having a plurality of adjustment attachment positions is located on the underside of the midsection.

6. Locator of claim 1 wherein the inflation valve is located on the underside of the nose end.

7. Locator of claim 1 wherein the balloon is structurally skeleton-free, non-rigid, made of relatively thin, expandable, lightweight film material impermeable to inflation gas and resistant to wetting by water, and has an inflation volume of about one cubic foot.

8. Locator of claim 7 wherein the balloon is filled with helium.

9. Combination of the locator of claim 1 with an inflation gas supply device, which comprises an openable housing having an interior space containing the uninflated locator, a tank fillable with pressurized inflation gas and having an openable discharge passage, a manifold having an inlet flow connected to the passage and an outlet releasably flow connected to the balloon inflation valve, a tether line dispenser containing a tether line having an end connectable to the balloon, and an actuator operatable upon opening the housing for opening the passage and discharging gas through the manifold to inflate the balloon.

10. Combination of claim 9 wherein the tank passage includes a tubular spout plugged with a mating hollow tubular sealing insert closed off at its outer end by a perforatable seal and at its inner end by an apertured disk spaced a selective axial distance inwardly of the seal and containing restrictive flow apertures distributed intermediate the center and periphery of the disk, and the actuator includes a piercing member yieldably disposed in facing relation to the seal under the retracting force of a resilient biasing element and movable against such force from a retracted position in which the member is spaced from the seal to an extended position in which the member perforates the seal and is spaced from the disk, to permit gas discharge in restrictive flow through the disk apertures and thence through the perforated seal and manifold to the balloon, and a control lever disposed for engagement with the member when in its retracted position for urging the member against the retracting force to its extended position, the restrictive flow apertures of the disk being collectively sized to control the rate of gas discharge sufficiently to prevent a surge of gas from locally striking the balloon interior with a jet force capable of perforating the balloon.

11. Combination of claim 10 wherein the disk contains a pair of equal size apertures located symmetrically in the disk for balanced controlled flow of gas therethrough.

* * * * *